(12) United States Patent
Kim

(10) Patent No.: US 8,681,292 B2
(45) Date of Patent: Mar. 25, 2014

(54) LIQUID CRYSTAL DISPLAY DEVICE

(75) Inventor: Ki-Won Kim, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 244 days.

(21) Appl. No.: 12/636,053

(22) Filed: Dec. 11, 2009

(65) Prior Publication Data

US 2010/0328580 A1 Dec. 30, 2010

(30) Foreign Application Priority Data

Jun. 24, 2009 (KR) ........................ 10-2009-0056640

(51) Int. Cl.
*G02F 1/1335* (2006.01)
*F21V 7/04* (2006.01)

(52) U.S. Cl.
USPC ................ 349/64; 349/65; 362/606; 362/608

(58) Field of Classification Search
USPC ............................... 349/64, 65; 362/606, 608
See application file for complete search history.

(56) References Cited

U.S. PATENT DOCUMENTS

| | | | |
|---|---|---|---|
| 7,570,321 B2 * | 8/2009 | Takahashi et al. | 349/65 |
| 7,796,214 B2 * | 9/2010 | Tsai et al. | 349/65 |
| 2006/0056200 A1 * | 3/2006 | Yamashita et al. | 362/620 |
| 2007/0279550 A1 * | 12/2007 | Hashimoto et al. | 349/64 |
| 2008/0068858 A1 * | 3/2008 | Yamamoto et al. | 362/606 |
| 2008/0117367 A1 * | 5/2008 | Abe | 349/106 |
| 2009/0002598 A1 * | 1/2009 | Choo et al. | 349/62 |

FOREIGN PATENT DOCUMENTS

| | | |
|---|---|---|
| CN | 1975530 A | 6/2007 |
| CN | 101149526 A | 3/2008 |
| CN | 101414081 A | 4/2009 |
| JP | 2004-071167 A | 3/2004 |
| JP | 2006-066120 A * | 3/2006 |
| JP | 2006-066120 A | 9/2006 |
| JP | 2006-259495 A | 9/2006 |
| JP | 2007148048 A | 6/2007 |
| JP | 2009-080947 A | 4/2009 |
| KR | 20080085988 A | 9/2008 |

OTHER PUBLICATIONS

Chinese Office Action dated Dec. 23, 2011, issued in corresponding Chinese patent application.
Chinese Patent Application No. 200910262389.6—Second Office Action—Issued by the State Intellectual Property Office of the People's Republic of China (SIPO) on Aug. 9, 2012—Including English Translation.
KIPO: Office Action for Korean Patent Application No. 10-2009-0056640—Issued on Apr. 24, 2013.

* cited by examiner

*Primary Examiner* — Mark Robinson
*Assistant Examiner* — Robert Tavlykaev
(74) *Attorney, Agent, or Firm* — Morgan, Lewis & Bockius LLP

(57) ABSTRACT

Disclosed is a liquid crystal display (LCD) device capable of enhancing brightness uniformity by preventing light leakage. The LCD device comprises an LC panel; an optical source for providing light to the LC panel; a light guide plate coupled to a light emission surface of the optical source; a light emitting diode (LED) printed circuit board (PCB) disposed on the light guide plate and the optical source; an optical sheet disposed on the light guide plate, and having a diffusion plate and a prism sheet on an upper surface of one side corresponding to the LED PCB, the diffusion plate having a light shielding member attached thereto; and a mold frame for accommodating therein the optical source, the light guide plate, and the optical sheet.

7 Claims, 3 Drawing Sheets

LIQUID CRYSTAL DISPLAY DEVICE

CROSS-REFERENCE TO A RELATED APPLICATION

Pursuant to 35 U.S.C. §119(a), this application claims the benefit of earlier filing date and right of priority to Korean Application No. 10-2009-0056640, filed on Jun. 24, 2009, the content of which is incorporated by reference herein in its entirety.

BACKGROUND OF THE INVENTION

1. Field of the Invention

The present invention relates to a liquid crystal display (LCD) device, and particularly, to an LCD device having a backlight assembly capable of preventing light leakage.

2. Background of the Invention

Generally, a Flat Panel Display (FPD) is applied not only to monitors of desk top computers, but also to small and light systems including portable computers such as notebooks and personal digital assistants (PDA), or portable phones. This FPD includes a liquid crystal display (LCD) device, a plasma display panel (PDP), a field emission display (FED) device, etc. Among these FPDs, the LCD device is being widely applied to portable phones, computer monitors, televisions, etc. due to an excellent viewing characteristic, average power consumption less than that of a cathode ray tube (CRT), and a small heating value.

The LCD device is a non-emissive type display device for displaying an image by controlling the amount of light incident thereon from an external optical source. Accordingly, the LCD device requires a backlight assembly including an additional optical source for irradiating light to an LC panel.

The backlight assembly includes an LED device serving as an optical source, a light guide plate coupled to a light emission surface of the LED device, and a plurality of optical sheets disposed on the light guide plate.

The conventional LCD device having the backlight assembly will be explained in more detail with reference to FIGS. 1 and 2.

FIG. 1 is a sectional view schematically showing a liquid crystal display (LCD) device having a backlight assembly in accordance with the conventional art, and FIG. 2 is an enlarged sectional view schematically showing a state that light leakage occurs from a light leakage portion disposed between a light guide plate and a light emitting diode (LED) printed circuit board (PCB) in the LCD device having a backlight assembly in accordance with the conventional art.

Referring to FIG. 1, the conventional LCD device comprises a display assembly (not shown), a backlight assembly (not shown) for providing light to the display assembly, and an accommodation member (a lower frame) 35 for accommodating therein the display assembly and the backlight assembly and fixing them.

Referring to FIG. 1, the display assembly includes an LC panel 10, a LCD Driver IC (not shown) mounted at one side of the LC panel 10, and a Flexible Printed Circuit Board (FPCB, not shown) having one end connected to the LC panel 10.

The LC panel 10 includes a color filter (CF) substrate 13, and a thin film transistor (TFT) substrate 11 disposed below the CF substrate 13.

Referring to FIG. 1, the backlight assembly includes an optical source 15, a light guide plate 17 coupled to the optical source 15, a reflector 25 disposed below the light guide plate 17, an optical sheet 20 disposed on the light guide plate 17, and a mold frame 23 for accommodating therein the optical source 15, the light guide plate 17, the reflector 25 and the optical sheet 20.

The optical source 15 is installed on a light incidence surface of the light guide plate 17, and includes an LED device 15a and a substrate 15b having the LED device 15a mounted thereon.

The LED device 15a is a side view type device, and emits light toward side surfaces of the light guide plate 17.

The light guide plate 17 is coupled to one side of the optical source 15, i.e., a light emission surface of the LED device 15a, and converts a point optical source or a linear optical source into a planar optical source.

Accordingly, light emitted from the LED device 15a is made to be incident onto one surface of the light guide plate 17 adjacent to the LED device 15a. And, the light incident onto the light guide plate 17 is converted into a planar optical source, and is made to be incident onto the LC panel 10.

The reflector 25 is disposed below the light guide plate 17, and reflects a part of light emitted to a lower side of the light guide plate 17, to the light emission surface of the backlight assembly thereby to enhance optical efficiency. And, the reflector 25 controls reflectivity of entire incident light, thereby implementing uniform brightness on the entire surface of the light emission surface.

The optical sheet 20 consists of a diffusion plate 19, and one or more prism sheets 21. And, the optical sheet 20 is disposed on the light guide plate 17, and allows light emitted from the light guide plate 17 to have uniform brightness.

The mold frame 23 is formed in a quadrangular frame shape having opened upper and lower surfaces, and accommodates therein the backlight assembly and the LC panel 10, sequentially.

An LED FPCB (Flexible Printed Circuit Board) 31 is attached onto the mold frame 23 and the optical source 15 by a first double-sided tape 29. As shown in FIG. 2, a part 33 of light emitted from the optical source 15 leaks onto side surfaces of the optical sheet 20 through light leakage portions 37 disposed between the double-sided tapes 29 attached between the LED FPCB 31 and the light guide plate 17.

The LC panel 10 is mounted on the mold frame 23 and the LED FPCB 31, and a second double-sided tape 27 is disposed between the LC panel 10 and the mold frame 23. The second double-sided tape 27 serves to fix the LC panel 10 to the mold frame 23.

The lower frame 35 is formed in a rectangular box shape having an opened upper surface, and fixes components of the LC panel 10 and the backlight assembly accommodated in the mold frame 23. Accordingly the lower frame 35 having the LC panel 10 and the backlight assembly accommodated therein is coupled to a top chassis (not shown), thereby constituting the LCD device.

However, the conventional LCD device has the following problems.

Firstly, light emitted from the optical source leaks onto the side surfaces of the optical sheet through the light leakage portions disposed between the double-sided tapes 29 attached between the LED FPCB 31 and the light guide plate 17. Especially, as light emitted from the LED has a high luminous intensity, the amount of light leakage occurring from a gap between the LED FPCB 31 and the double-sided tape increases.

This may cause the LCD device to have lowered brightness uniformity.

SUMMARY OF THE INVENTION

Therefore, an object of the present invention is to provide a liquid crystal display (LCD) device capable of enhancing brightness uniformity by preventing light leakage.

Another object of the present invention is to provide a liquid crystal display (LCD) device capable of enhancing brightness and brightness uniformity, and capable of having a think thickness.

To achieve these and other advantages and in accordance with the purpose of the present invention, as embodied and broadly described herein, there is provided a liquid crystal display device, comprising: an LC panel; an optical source for providing light to the LC panel; a light guide plate coupled to a light emission surface of the optical source; a light emitting diode (LED) printed circuit board (PCB) disposed on the light guide plate and the optical source; an optical sheet disposed on the light guide plate, and having a diffusion plate and a prism sheet on an upper surface of one side corresponding to the LED PCB, the diffusion plate having a light shielding member attached thereto; and a mold frame for accommodating therein the optical source, the light guide plate, and the optical sheet.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of the present invention, with reference to the accompanying drawings.

Hereinafter, a liquid crystal display (LCD) device having a backlight assembly according to the present invention will be explained in more detail with reference to the attached drawings.

Figure 1:
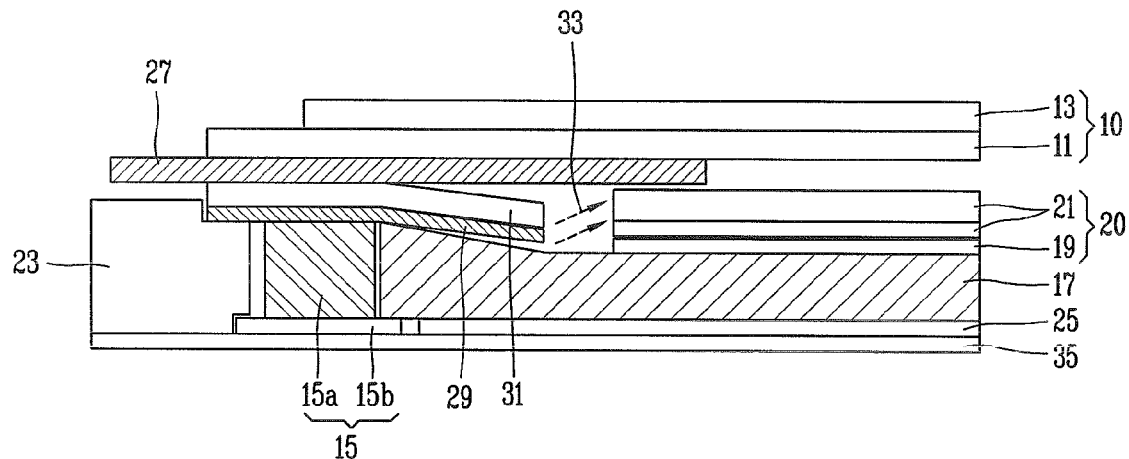
FIG. 1 is a sectional view schematically showing a liquid crystal display (LCD) device having a backlight assembly in accordance with the conventional art.
Figure 2:
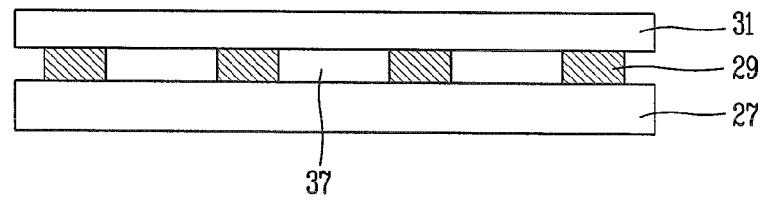
FIG. 2 is an enlarged sectional view schematically showing a state that light leakage occurs from a light leakage portion disposed between a light guide plate and a light emitting diode (LED) printed circuit board (PCB) in the LCD device having a backlight assembly in accordance with the conventional art.
Figure 3:
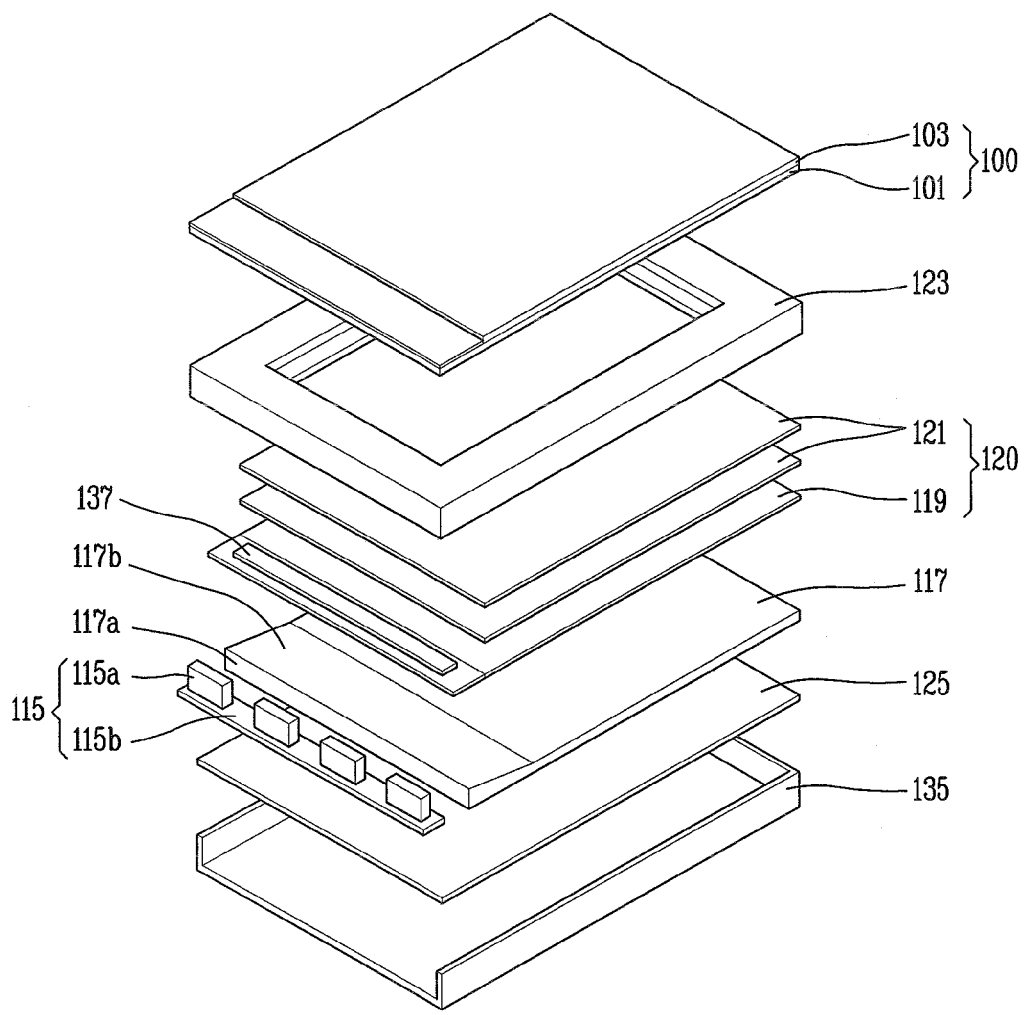
FIG. 3 is an exploded perspective view schematically showing an LCD device having a backlight assembly according to a first embodiment of the present invention.
Figure 4:
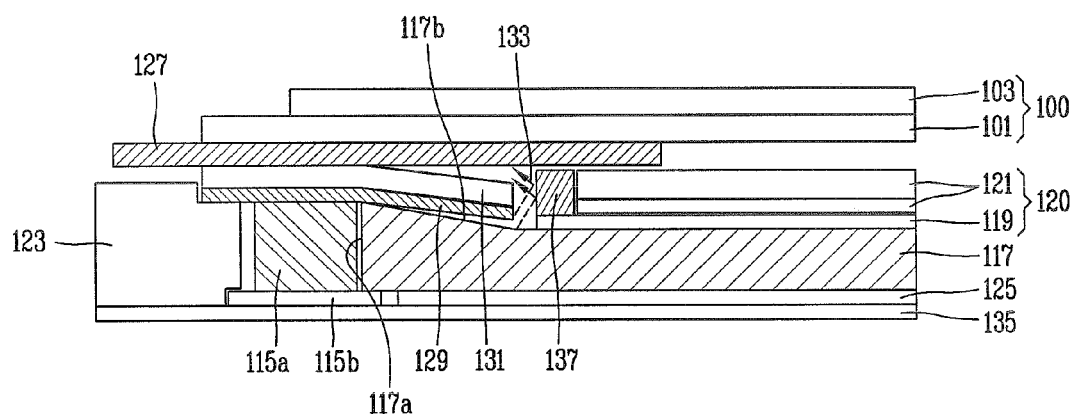
FIG. 4 is a sectional view schematically showing the LCD device having a backlight assembly according to a first embodiment of the present invention.

FIG. 3 is an exploded perspective view schematically showing an LCD device having a backlight assembly according to a first embodiment of the present invention, and FIG. 4 is a sectional view schematically showing the LCD device having a backlight assembly according to a first embodiment of the present invention.

Although not shown, the LCD device of the present invention comprises a display assembly, a backlight assembly for providing light to the display assembly, and an accommodation member (a lower frame) 135 for accommodating therein the display assembly and the backlight assembly and fixing them.

Referring to FIGS. 3 and 4, the display assembly includes an LC panel 100, a LCD Driver IC (not shown) mounted at one side of the LC panel 100, and a Flexible Printed Circuit Board (FPCB, not shown) having one end connected to the LC panel 100.

The LC panel 100 includes a color filter (CF) substrate 103, and a thin film transistor (TFT) substrate 101 disposed below the CF substrate 103.

Although not shown, the color filter substrate 103 is provided with a color filter on one surface thereof, and a common electrode formed of a transparent conductor such as Indium Tin Oxide (ITO) or Indium Zinc Oxide (IZO) on the color filter.

Although not shown, the TFT substrate 101 is provided with TFTs implemented in the form of matrixes, and source and gate terminals of the TFT are connected to data lines and gate lines, respectively. And, a drain terminal of the TFT is connected to a pixel electrode.

Although not shown, the LCD Driver IC (not shown) is mounted to one side of the TFT substrate 101, and generates data and gate driving signals for driving the LC panel 100, and a plurality of timing signals for applying the data and gate driving signals to the LC panel 100 at a proper time point. And, the LCD Driver IC applies the gate and data driving signals to the gate and data lines of the LC panel 100, respectively.

Although not shown, the flexible printed circuit board (FPCB) has one end connected to one side of the TFT substrate 101, and converts an analogue signal inputted from outside through a pad portion (not shown) formed at another end of the FPCB into a digital signal. Then, the FPCB supplies the converted digital signal to the LCD Driver IC. Here, another end of the FPCB is curvedly mounted to a rear surface of the accommodation member (not shown).

A passivation film for protecting the LCD Driver IC mounted at one side of the LC panel 101 and the FPCB may be disposed on the TFT substrate 101. That is, the passivation film is formed to encompass the LCD Driver IC and the FPCB.

Referring to FIGS. 3 and 4, the backlight assembly includes an optical source 115, a light guide plate 117 coupled to the optical source 115, a reflector 125 disposed below the light guide plate 117, an optical sheet 120 disposed on the light guide plate 117, and a mold frame 123 for accommodating therein the optical source 115, the light guide plate 117, the reflector 125 and the optical sheet 120.

The optical source 115 is installed on a light incidence surface 117a of the light guide plate 117, and includes an LED device 115a and a substrate 115b having the LED device 115a mounted thereon.

The LED device 115a is a side view type device, and emits light toward side surfaces of the light guide plate 117. And, the substrate 115b is implemented as an FPCB having excellent flexibility, and is provided with a circuit (not shown) therein. The substrate 115b supplies external power to the LED device 115a through the circuit.

The light guide plate 117 is coupled to one side of the optical source 115, i.e., a light emission surface of the LED device 115a, and converts a point optical source or a linear optical source into a planar optical source.

At one side of the light guide plate 117 coupled to the light emission surface of the LED device 115a, there are provided a light incidence surface 117a having the same height as the light emission surface of the LED device 115a, and an inclination surface 117b downwardly inclined from an upper surface of one side of the light incidence surface 117a.

Accordingly, light emitted from the LED device 115a is made to be incident onto one surface of the light guide plate 117 adjacent to the LED device 115a, and then is converted into a planar optical source. Then, the converted light is made to be incident onto the LC panel 100.

One side surface of the light guide plate 117 is implemented as the light incidence surface 117a onto which light is made to be incident. And, the optical source 115 (LED device 115a) spacing from the light incidence surface 117a by a predetermined distance is disposed on the light incidence surface 117a. A length of the light incidence surface 117a is equal to a height of the light emission surface of the LED device 115a. Accordingly, light emitted from the light emission surface of the LED device 115a is made to be incident onto the light incidence surface 117a. Next, the incident light converts a point optical source into a planar optical source through inside of the light guide plate 117, and is then emitted toward the LC panel 100.

The reflector 125 is disposed below the light guide plate 117, and reflects a part of light emitted to a lower side of the light guide plate 117, to the light emission surface of the backlight assembly thereby to enhance optical efficiency. And, the reflector 125 controls reflectivity of entire incident light, thereby implementing uniform brightness on the entire surface of the light emission surface.

The optical sheet 120 consists of a diffusion plate 119, and one or more prism sheets 121 including upper and lower prism sheets. And, the optical sheet 120 is disposed on the light guide plate 117, and allows light emitted from the light guide plate 117 to have uniform brightness.

One side of the diffusion plate 119 is extending toward the optical source 115 by a predetermined length, so that a space portion is provided on an upper surface of the diffusion plate 119. An opaque light shielding member 137 is attached to the space portion of the diffusion plate 119. Preferably, the light shielding member 137 has a height equal to or higher than a height of the lower prism sheet of the optical sheet 120. As the light shielding member 137, a light shielding tape, or other member formed of an opaque material may be used by being attached to the space portion of the diffusion plate 119. Accordingly, the light shielding member 137 prevents leakage of light 133 emitted from the optical source 115 to be incident onto side surfaces of the optical sheet 120. That is, the light shielding member 137 prevents light emitted from the optical source 115 from passing through prism mountains (not shown) on a prism sheet 121.

One side of the diffusion plate 119 may not be extended, but the prism sheet 121 may be formed to have a short length. By the shortened length, the light shielding member 137 may be attached onto the diffusion plate 119 exposed to the outside. The mold frame 123 is formed in a quadrangular frame shape having opened upper and lower surfaces, and accommodates therein the backlight assembly and the LC panel 100, sequentially.

An LED FPCB (Flexible Printed Circuit Board) 131 is attached onto the mold frame 123 and the optical source 115 by a first double-sided tape 129. One side of the LED FPCB 131 and the first double-sided tape 129 is extending up to the inclination surface 117b of the light guide plate 117.

On the mold frame 123 and the LED FPCB 131, the LC panel 100 is mounted. A second double-sided tape 127 is disposed between the LC panel 100 and the mold frame 123, thereby fixing the LC panel 100 to the mold frame 123.

The lower frame 135 is formed in a rectangular box shape having an opened upper surface, and fixes components of the LC panel 100 and the backlight assembly accommodated in the mold frame 123. Accordingly the lower frame 135 having the LC panel 100 and the backlight assembly accommodated therein is coupled to a top chassis (not shown), thereby constituting the LCD device.

In the above description, the optical source 115 is disposed at one side of the light guide plate 117. However, the optical source 115 may be disposed at both sides of the light guide plate 117, or at four edges of the light guide plate 117. According to the arrangement of the optical source 115, the light shielding member 137 disposed at one side of the diffusion plate 119 may be selectively implemented.

Hereinafter, an LCD device having a backlight assembly according to a second embodiment of the present invention will be explained in more detail with reference to FIG. 5.

Figure 5:
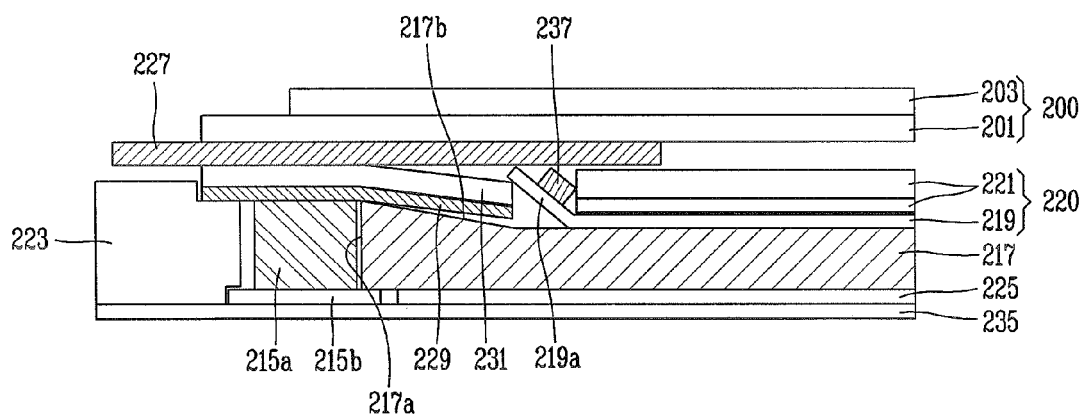
FIG. 5 is a sectional view schematically showing an LCD device having a backlight assembly according to a second embodiment of the present invention.

FIG. 5 is a sectional view schematically showing an LCD device having a backlight assembly according to a second embodiment of the present invention.

Although not shown, the LCD device of the present invention comprises a display assembly, a backlight assembly for providing light to the display assembly, and an accommodation member (a lower frame) 235 for accommodating therein the display assembly and the backlight assembly and fixing them.

Referring to FIG. 5, the display assembly includes an LC panel 200, a LCD Driver IC (not shown) mounted at one side of the LC panel 200, and a Flexible Printed Circuit Board (FPCB, not shown) having one end connected to the LC panel 200.

The LC panel 200 includes a color filter (CF) substrate 203, and a thin film transistor (TFT) substrate 201 disposed below the CF substrate 203.

Although not shown, the color filter substrate 203 is provided with a color filter on one surface thereof, and a common electrode formed of a transparent conductor such as Indium Tin Oxide (ITO) or Indium Zinc Oxide (IZO) on the color filter.

Although not shown, the TFT substrate 201 is provided with TFTs implemented in the form of matrixes, and source and gate terminals of the TFT are connected to data lines and gate lines, respectively. And, a drain terminal of the TFT is connected to a pixel electrode.

Although not shown, the LCD Driver IC (not shown) is mounted to one side of the TFT substrate 201, and generates data and gate driving signals for driving the LC panel 100, and a plurality of timing signals for applying the data and gate driving signals to the LC panel 100 at a proper time point. And, the LCD Driver IC applies the gate and data driving signals to the gate and data lines of the LC panel 200, respectively.

Although not shown, the flexible printed circuit board (FPCB) has one end connected to one side of the TFT substrate 201, and converts an analogue signal inputted from outside through a pad portion (not shown) formed at another end of the FPCB into a digital signal. Then, the FPCB supplies the converted digital signal to the LCD Driver IC. Here, another end of the FPCB is curvedly mounted to a rear surface of the accommodation member (not shown).

A passivation film for protecting the LCD Driver IC mounted at one side of the LC panel 201 and the FPCB may be disposed on the TFT substrate 201. That is, the passivation film is formed to encompass the LCD Driver IC and the FPCB.

Referring to FIG. 5, the backlight assembly includes an optical source 215, a light guide plate 217 coupled to the optical source 215, a reflector 225 disposed below the light guide plate 217, an optical sheet 220 disposed on the light guide plate 217, and a mold frame 223 for accommodating therein the optical source 215, the light guide plate 217, the reflector 225 and the optical sheet 220.

The optical source 215 is installed on a light incidence surface 217a of the light guide plate 217, and includes an LED device 215a and a substrate 215b having the LED device 215a mounted thereon.

The LED device 215a is a side view type device, and emits light toward side surfaces of the light guide plate 217. And, the substrate 215b is implemented as an FPCB having excellent flexibility, and is provided with a circuit (not shown) therein. The substrate 215b supplies external power to the LED device 215a through the circuit.

The light guide plate 217 is coupled to one side of the optical source 215, i.e., a light emission surface of the LED device 215a, and converts a point optical source or a linear optical source into a planar optical source.

At one side of the light guide plate 217 coupled to the light emission surface of the LED device 215a, there are provided a light incidence surface 217a having the same height as the light emission surface of the LED device 215a, and an inclination surface 217b downwardly inclined from an upper surface of one side of the light incidence surface 217a.

Accordingly, light emitted from the LED device 215a is made to be incident onto one surface of the light guide plate 217 adjacent to the LED device 215a, and then is converted into a planar optical source. Then, the converted light is made to be incident onto the LC panel 200. One side surface of the light guide plate 217 is implemented as the light incidence surface 217a onto which light is made to be incident. And, the optical source 215 (LED device 215a) spacing from the light incidence surface 217a by a predetermined distance is disposed on the light incidence surface 217a. A length of the light incidence surface 217a is equal to a height of the light emission surface of the LED device 215a. However, the present invention is not limited to this. Accordingly, light emitted from the light emission surface of the LED device 215a is made to be incident onto the light incidence surface 217a. Next, the incident light converts a point optical source into a planar optical source through inside of the light guide plate 217, and is then emitted toward the LC panel 200.

The reflector 225 is disposed below the light guide plate 217, and reflects a part of light emitted to a lower side of the light guide plate 217, to the light emission surface of the backlight assembly thereby to enhance optical efficiency. And, the reflector 225 controls reflectivity of entire incident light, thereby implementing uniform brightness on the entire surface of the light emission surface.

The optical sheet 220 consists of a diffusion plate 219, and one or more prism sheets 221 including upper and lower prism sheets. And, the optical sheet 220 is disposed on the light guide plate 217, and allows light emitted from the light guide plate 217 to have uniform brightness.

One side of the diffusion plate 219 is extending toward an LED FPBC 231 disposed on the optical source 215, so that an extension portion 219a is formed. An opaque light shielding member 237 is attached to an upper surface of the extension portion 219a. Preferably, the light shielding member 237 has a height equal to or higher than a height of a lower prism sheet (not shown) of the prism sheet 221 of the optical sheet 220. As the light shielding member 237, a light shielding tape, or other member formed of an opaque material may be used by being attached to the extension portion 219a of the diffusion plate 219. Accordingly, the light shielding member 237 prevents leakage of light 233 emitted from the optical source 215 to be incident onto side surfaces of the optical sheet 220. That is, the light shielding member 237 prevents light emitted from the optical source 215 from passing through prism mountains (not shown) on the prism sheet 221.

The mold frame 223 is formed in a quadrangular frame shape having opened upper and lower surfaces, and accommodates therein the backlight assembly and the LC panel 200, sequentially.

The LED FPCB (Flexible Printed Circuit Board) 231 is attached onto the mold frame 223 and the optical source 215 by a first double-sided tape 229. One side of the LED FPCB 231 and the first double-sided tape 229 is extending up to the inclination surface 217b of the light guide plate 217.

On the mold frame 223 and the LED FPCB 231, the LC panel 200 is mounted. A second double-sided tape 227 is disposed between the LC panel 200 and the mold frame 223, thereby fixing the LC panel 200 to the mold frame 223.

The lower frame 235 is formed in a rectangular box shape having an opened upper surface, and fixes components of the LC panel 200 and the backlight assembly accommodated in the mold frame 223. Accordingly, the lower frame 235 having the LC panel 200 and the backlight assembly accommodated therein is coupled to a top chassis (not shown), thereby constituting the LCD device.

In the above description, the optical source 215 is disposed at one side of the light guide plate 217. However, the optical source 215 may be disposed at both sides of the light guide plate 217, or at four edges of the light guide plate 217. According to the arrangement of the optical source 215, the light shielding member 237 disposed at one side of the diffusion plate 219 may be selectively implemented.

In the LCD device according to the present invention, the opaque light shielding member is attached to the space portion of the diffusion plate, thereby preventing leakage of light emitted from the optical source to be incident onto side surfaces of the optical sheet.

As the light leakage is prevented, brightness and brightness uniformity are enhanced, and the LCD device has a thin thickness.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

As the present features may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A liquid crystal display (LCD) device, comprising:
  a liquid crystal (LC) panel;
  an optical source for providing light to the LC panel;
  a light guide plate coupled to a light emission surface of the optical source, wherein the light guide plate has a light incidence surface having the same height as the light emission surface of the optical source, and an inclination surface downwardly inclined from one side of the light incidence surface;

a light emitting diode (LED) printed circuit board (PCB) disposed on the light guide plate and the optical source;

an optical sheet disposed on the light guide plate, and having a diffusion plate and a prism sheet on an upper surface of one side corresponding to the LED PCB, wherein the prism sheet comprises a lower prism sheet and an upper prism sheet, the diffusion plate having a light shielding member attached thereto, wherein one side of the diffusion plate extends up to an edge portion of an upper side of the LED PCB disposed on the inclination surface of the light guide plate so as to have a space portion on an upper surface of an extended portion of the diffusion plate, and the one side of the diffusion plate is supported by the edge portion of the upper side of the LED PCB;

a light shielding member attached to the upper surface of the extended portion of the diffusion plate, wherein the light shielding member is in contact with only a side of the optical sheet and the upper surface of the extended portion of the diffusion plate without being in contact with the upper surface of the optical sheet, wherein the light shielding member prevents leakage of light emitted from the optical source to be incident onto side surfaces of the optical sheet, the light shielding member has a height which is equal to or higher than a height of the lower prism sheet of the optical sheet; and a mold frame for accommodating therein the optical source, the light guide plate, and the optical sheet, wherein the LED PCB is attached onto the mold frame and the optical source by a double-sided tape, and one side of the LED PCB and the double-sided tape extend up to the inclination surface of the light guide plate, and wherein the extended portion of the diffusion plate is inclined relative to the LC panel and is a terminal end of the diffusion plate.

2. The LCD device of claim 1, wherein the light shielding member is implemented as a light shielding tape or an opaque layer.

3. The LCD device of claim 1, wherein the light shielding member is arranged in correspondence to the LED PCB.

4. The LCD device of claim 1, wherein the double-sided tape is disposed between the LC panel and the LED PCB, and between the LED PCB and the light guide plate.

5. The LCD device of claim 1, wherein the inclination surface is formed on an upper surface of one side of the light guide plate adjacent to the optical source.

6. The LCD device of claim 1, wherein a reflection sheet is disposed on a lower surface of the light guide plate.

7. A liquid crystal display (LCD) device, comprising:

a liquid crystal (LC) panel;

an optical source for providing light to the LC panel;

a light guide plate coupled to a light emission surface of the optical source, wherein the light guide plate has a light incidence surface having the same height as the light emission surface of the optical source, and an inclination surface downwardly inclined from one side of the light incidence surface;

a light emitting diode (LED) printed circuit board (PCB) disposed on the light guide plate and the optical source;

an optical sheet disposed on the light guide plate, and having a diffusion plate and a prism sheet on an upper surface of one side corresponding to the LED PCB, wherein the prism sheet comprises a lower prism sheet and an upper prism sheet, the diffusion plate having a light shielding member attached thereto, wherein one side of the diffusion plate extends up to an edge portion of an upper side of the LED PCB disposed on the inclination surface of the light guide plate so as to have a space portion on an upper surface of an extended portion of the diffusion plate, and one side of the diffusion plate is supported by the edge portion of the upper side of the LED PCB;

a light shielding member attached to the upper surface of the extended portion of the diffusion plate, wherein the light shielding member is in contact with only a side of the optical sheet and the upper surface of the extended portion of the diffusion plate without being in contact with the upper surface of the optical sheet, wherein the light shielding member prevents leakage of light emitted from the optical source to be incident onto side surfaces of the optical sheet, the light shielding member has a height which is equal to or higher than a height of the lower prism sheet of the optical sheet; and a mold frame for accommodating therein the optical source, the light guide plate, and the optical sheet, wherein the LED PCB is attached onto the mold frame and the optical source by a double-sided tape, and one side of the LED PCB and the double-sided tape extend up to the inclination surface of the light guide plate, and wherein the diffusion plate consists of one portion parallel to the LC panel and one portion inclined relative to the LC panel, the inclined portion being the extended portion of the diffusion plate.

* * * * *